March 29, 1955 K. H. BECK ET AL 2,705,321

PERCENTAGE MODULATION SYSTEM FOR PROPORTIONAL CONTROL

Filed June 29, 1949

INVENTOR
KENNETH H. BECK
&
WARREN A. SCHREINER
BY
Semmes, Keegin, Robinson & Semmes
ATTORNEYS United States Patent Office 2,705,321

Patented Mar. 29, 1955

2,705,321

PERCENTAGE MODULATION SYSTEM FOR PROPORTIONAL CONTROL

Kenneth H. Beck, Newton, and Warren A. Schreiner, Pineville, Pa., assignors to Wing Engineering Corporation, Baltimore, Md., a corporation of Maryland Application June 29, 1949, Serial No. 102,046

2 Claims. (Cl. 343—206)

Figure 2:
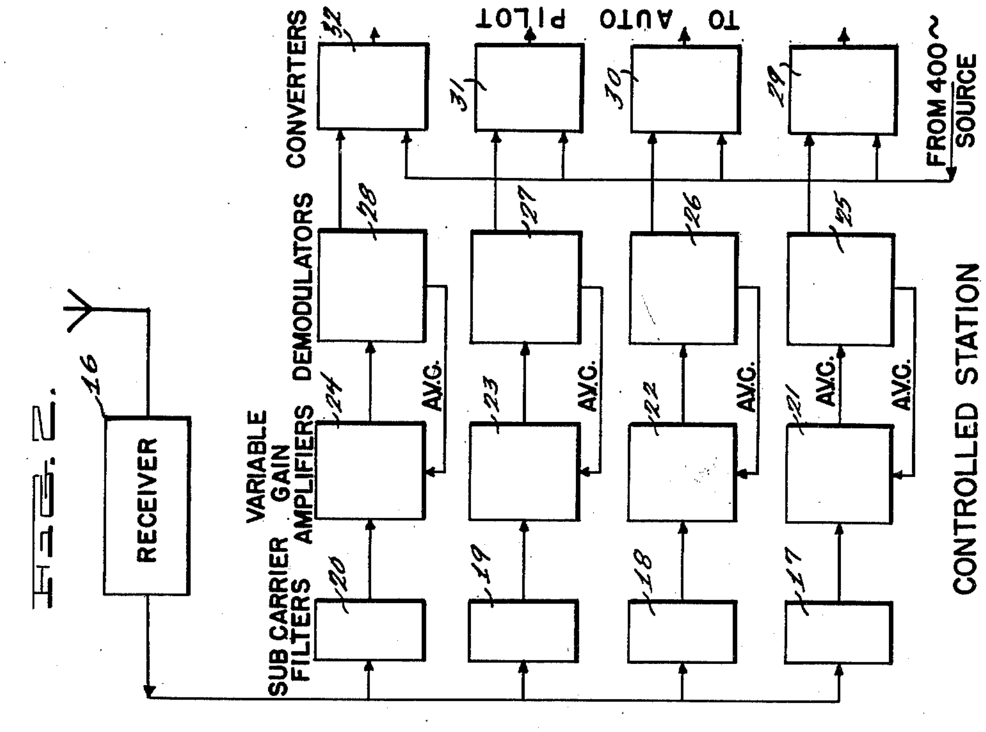

This invention relates to remote control apparatus and more particularly to a control system employing proportional signals to accomplish gyroscope stabilized proportional control.

An object of this invention is to provide a control system in which each control channel carries its own reference signal.

Another object of this invention is to provide a system of remote control employing proportional signals in which it is not necessary to supply a separate sub-carrier for transmitting the reference signal.

A further object of this invention is to provide a remote control system to accomplish gyroscope stabilized proportional control in which exact compensation for changes in radio link transmission can be secured over the entire range of modulating signal levels.

Still another object of this invention is to provide a remote control system employing a single low-frequency signal source for supplying all of the control station "pickoff" devices.

Other and further objects of this invention will be apparent to those skilled in the art to which it relates from the following specification and claims.

In accordance with this invention there is provided a system for transmitting proportional signals by means of radio or wire for the purpose of providing remote control. The system disclosed in this specification is an improvement over the system disclosed in application Serial No. 49,592 filed September 16, 1948, for Proportional Control Mechanism. The advantages of the system disclosed in the present specification are that each of a plurality of proportional signal channels carries its own reference signal and thus frees the system from dependence on the frequency response stability of the radio link between the control station and the controlled station in cases where the control is accomplished by radio. This obviates the necessity of providing a separate sub-carrier for a reference signal so that the selection of sub-carrier frequencies for control purposes on the basis of minimum intermodulation distortion is simplified. Furthermore, this permits a reduction in the total band width required.

According to the invention, a plurality of constant amplitude sub-carrier frequency oscillation generators is employed in the control station and these are connected to individual substantially linear modulators the outputs of which are connected to a mixer that is connected to the transmitter of the control station. A single low-frequency oscillator is employed the output of which is connected through a plurality of control "pickoffs" to the different modulators to modulate the different sub-carrier frequency oscillations. These "pickoffs" consist of devices that are mechanically connected to control elements, such as a lever or a dial. The displacement of the control element varies the amplitude of the low-frequency oscillations supplied through the respective "pickoff" device to the respective modulator so that the signals supplied from the respective sub-carrier oscillators are modulated by the varying amplitude low-frequency oscillations from the respective "pickoff" devices.

The modulations are linear, i. e., proportional to the displacement of the control element of the "pickoff." It is assumed that the average value of the modulated oscillations from the sub-carrier oscillators is not changed by the action of the modulators so that varying the control elements of the "pickoff" devices results in varying the percentage modulation of the sub-carrier oscillations by the signals supplied from the low-frequency oscillator.

Thus the constant average value of each of the sub-carrier oscillations effectively supplies its own reference level.

At the controlled station, the control signals are received by a radio receiver having a plurality of sub-carrier filters connected thereto so as to separate the transmitted complex signal into the original channel frequencies. The outputs of these filters are applied respectively to variable gain amplifiers connected thereto and the outputs of the variable gain amplifiers are supplied respectively to suitable demodulators which in turn are connected respectively to 400 cycle converters. The output signals of these converters are connected to signal responsive controlling apparatus which in the use of airplane control will be the signal responsive devices of an automatic pilot.

Figure 1:
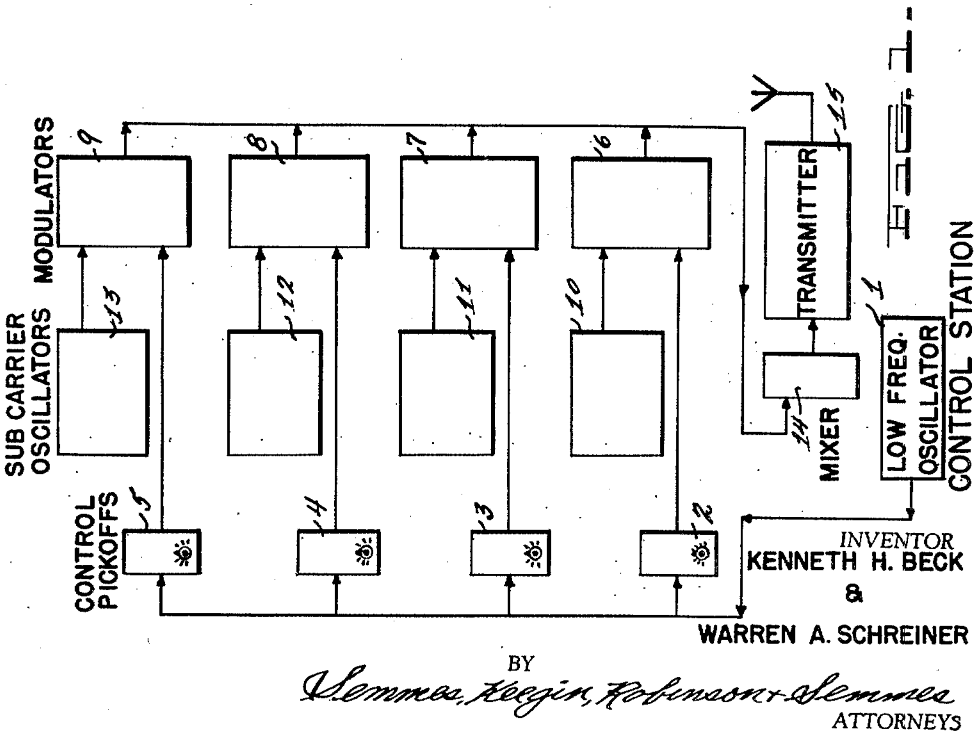

Further details of this invention will be set forth in the following specification and the drawing in which briefly Fig. 1 is a schematic diagram of the control station and;

Fig. 2 is a schematic diagram of the controlled station.

Referring to the drawing in detail there is shown in Fig. 1 a schematic diagram of the circuit arrangement of the control station in which the different parts are shown in block form in as much as these elements are of conventional design. As shown in Fig. 1, a low-frequency oscillator 1 is connected to a plurality of control "pickoffs" 2, 3, 4 and 5. These control "pickoffs" may consist of variable resistors, variable inductors or variable capacitors which may be varied by being mechanically connected to a control element such as a lever or a dial so that the output of each control "pickoff" may be varied in accordance with the displacement of its control element. The outputs of the control "pickoffs" 2, 3, 4 and 5 are connected to linear modulators 6, 7, 8, and 9 respectively, to which are also connected constant amplitude sub-carrier frequency oscillators 10, 11, 12 and 13 respectively, so that the oscillations from these sub-carrier frequency oscillators are modulated by the varying amplitude low-frequency oscillations from the respective "pickoffs" 2, 3, 4 and 5. The outputs of the modulators 6, 7, 8 and 9 are combined in a mixer 14 and applied to a radio transmitter 15 for transmission as a complex signal to the controlled station.

At the controlled station the signals are received by a receiver 16 which includes suitable amplifiers for amplifying the received signals. The output of the receiver 16 is supplied to sub-carrier filters 17, 18, 19, and 20 which consist of filter devices adapted to separate the received complex signal into the frequencies of the sub-carrier oscillators 10, 11, 12 and 13 of the control station so that the outputs of these filters correspond to the frequencies of these respective sub-carrier oscillators.

The outputs of the filters 17, 18, 19 and 20 are applied to the inputs of variable gain amplifiers 21, 22, 23, and 24 respectively, and the outputs of these variable gain amplifiers are supplied to demodulators 25, 26, 27 and 28 respectively. A portion of the demodulated signal is supplied from each of the demodulators 25, 26, 27 and 28 to each of the variable gain amplifiers 21, 22, 23 and 24 respectively for automatic volume control through respective AVC connections.

If the resultant AVC action is flat the average value of the modulated sub-carrier signals at the inputs to the demodulators 25, 26, 27 and 28 will be substantially constant. Thus the amplitude of the low-frequency modulating signal obtained at the outputs of the demodulators 25, 26, 27 and 28 will be a true representation of the percentage modulation accomplished at the control station.

The outputs of the demodulators 25, 26, 27 and 28 are connected to converters 29, 30, 31 and 32 respectively, to control these converters in accordance with the respective low-frequency modulating signals obtained from the demodulators. Where this apparatus is to be employed on aircraft the converters may be designed to be energized from a 400 cycle power supply and these converters may be connected to the automatic pilot as described in application Ser. No. 49,592.

While this invention has been set forth in detail with respect to a particular embodiment thereof it is not desired to limit it to the exact details described except insofar as those details are defined by the following claims.

We claim:

1. A remote control system for controlling a mobile device from a remote point comprising a control station located at the remote point and a controlled station located at the mobile device, said control station comprising a low-frequency oscillator, devices for controlling the amplitude of the low-frequency oscillations generated by said oscillator in accordance with signals to be transmitted, a plurality of substantially constant amplitude sub-carrier frequency oscillators, means for modulating oscillations generated by said sub-carrier frequency oscillators in accordance with said low-frequency oscillations of controlled amplitude, and means for transmitting said modulated sub-carrier frequency oscillations as a complex signal to said controlled station, said controlled station comprising a receiver, a plurality of filters connected to said receiver for separating the complex signal received from said control station into separate signals corresponding to the modulated signals of said sub-carrier oscillators, a plurality of variable gain amplifiers connected to separately amplify the outputs of said filters, means for demodulating separately the outputs of said amplifiers, automatic control circuits applying a portion of the output of each demodulator to its preceding amplifier to control the gain of said amplifier and to provide a substantially constant average input level to said demodulators to produce signals the amplitudes of which correspond to the percentage modulation accomplished at said control station, and means for applying the outputs of said demodulators to control circuits of said controlled station.

2. In a multi-channel remote control system, a source of low-frequency oscillations of fixed frequency, a plurality of modulators, one for each channel, a plurality of sources of fixed-frequency sub-carrier oscillations of different frequencies, said sources of sub-carrier oscillations being connected to said modulators respectively, a plurality of control pick-offs connected between said low-frequency source and said respective modulators to vary the respective modulator outputs in accordance with the adjustments of said control pick-offs, means for mixing the outputs of all of said modulators to provide a complex wave, means for transmitting said wave, means for receiving said wave at a remote point, a plurality of filters tuned to separate said respective sub-carrier frequencies, means for applying said received complex wave to said respective filters, a variable gain amplifier connected to each of said filters, independent means for separately demodulating the outputs of said amplifiers, respective flat-characteristic A. V. C. circuits for applying a portion of the output of each demodulator of the corresponding amplifier to provide constant average input level to said demodulators, and means for controlling respective control elements from the outputs of said respective demodulators, whereby the energization of said control elements will be proportional to the respective percentages of modulation of the corresponding sub-carrier oscillator.

References Cited in the file of this patent

UNITED STATES PATENTS

| | | |
|---|---|---|
| 1,361,522 | Espenschied | Dec. 7, 1920 |
| 1,559,867 | Griggs | Nov. 3, 1925 |
| 2,233,183 | Roder | Feb. 25, 1941 |
| 2,256,487 | Moseley et al. | Sept. 23, 1941 |
| 2,262,841 | Goddard | Nov. 18, 1941 |
| 2,298,409 | Peterson | Oct. 13, 1942 |
| 2,400,073 | Cawein | May 14, 1946 |
| 2,481,516 | Jacobsen | Sept. 13, 1949 |
| 2,490,768 | Althouse et al. | Dec. 13, 1949 |
| 2,515,254 | Nosker | July 18, 1950 |
| 2,523,703 | Larsen et al. | Sept. 26, 1950 |